United States Patent [19]
Patzig et al.

[11] Patent Number: 5,257,756
[45] Date of Patent: * Nov. 2, 1993

[54] ARRANGEMENT OF SENSORS ON THE LANDING GEAR OF AN AIRCRAFT FOR MEASURING THE WEIGHT AND POSITION OF CENTER OF GRAVITY OF THE AIRCRAFT

[75] Inventors: Hans-Norbert Patzig, Bad Homburg; Klaus Schult, Frankfurt, both of Fed. Rep. of Germany

[73] Assignee: Adolf Schindling AG, Frankfurt, Fed. Rep. of Germany

[*] Notice: The portion of the term of this patent subsequent to Apr. 27, 2010 has been disclaimed.

[21] Appl. No.: 746,330

[22] Filed: Aug. 16, 1991

[30] Foreign Application Priority Data

Sep. 13, 1990 [DE] Fed. Rep. of Germany ....... 4029083
Apr. 18, 1991 [DE] Fed. Rep. of Germany ....... 4112674

[51] Int. Cl.⁵ .............................................. B64C 25/00
[52] U.S. Cl. ................................. 244/103 R; 73/65.01
[58] Field of Search ........................ 244/100 R, 103 R; 73/146.4, 146.5, 862.64, 862.68, 779

[56] References Cited

U.S. PATENT DOCUMENTS

| | | | |
|---|---|---|---|
| Re. 32,746 | 9/1988 | Nelson et al. | 73/779 |
| 2,443,045 | 6/1948 | Magruder et al. | 244/100 R |
| 3,464,259 | 9/1969 | Farr | 73/862.35 |
| 3,625,053 | 12/1971 | Laimins | 244/103 R |
| 4,269,070 | 5/1981 | Nelson et al. | 73/779 |
| 4,312,042 | 1/1982 | Bateman | 244/100 R |
| 4,685,338 | 8/1987 | Bonfils | 73/862.62 |
| 4,782,706 | 11/1988 | Kister et al. | 73/779 |

FOREIGN PATENT DOCUMENTS

| | | | |
|---|---|---|---|
| 0026446 | 4/1981 | European Pat. Off. | |
| 2520870 | 8/1983 | France | 244/100 R |
| 2586806 | 3/1987 | France | 73/862.62 |

Primary Examiner—Michael S. Huppert
Assistant Examiner—Anne E. Bidwell
Attorney, Agent, or Firm—Martin A. Farber

[57] ABSTRACT

An arrangement of sensors on the landing gear of an aircraft measure the weight and position of center of gravity of the aircraft. In order to compensate for errors caused by moment of torsion, one sensor each is arranged on a pair of lugs (53, 54) at two measurement points of an axle (55) or bogie beam lying opposite each other on the outside or of a shock-absorber landing-gear leg. Each of the sensors gives off an electric output variable corresponding to a vertical displacement (sensor deflection) between the lugs of a pair. The lugs (53, 54) are tapered at their roots (61, 62).

3 Claims, 6 Drawing Sheets

ARRANGEMENT OF SENSORS ON THE LANDING GEAR OF AN AIRCRAFT FOR MEASURING THE WEIGHT AND POSITION OF CENTER OF GRAVITY OF THE AIRCRAFT

FIELD AND BACKGROUND OF THE INVENTION

The present invention relates to an arrangement of sensors on the landing gear of an aircraft for measuring the weight and position of center of gravity of the aircraft.

In the arrangements of this type which are known in actual practice, there are provided, in particular, inductive sensors of the type having two series-connected coils which are arranged one above the other with a common center line in a first sensor part, and having a tongue of ferromagnetic material which is moveable in the coils and is part of a second sensor part. The first and the second sensor parts are each arranged on one lug of a pair of lugs which protrude at the measurement point from an axle or a bogie beam of an aircraft landing gear. The series-connected coils of the sensor act as inductive voltage divider and each of them gives off a signal if a line of bend of the axle or bogie beam is not curved uniformly and with center symmetry, i.e. symmetric to the center line of a pair of lugs, at the point of measurement. The line of bend is in this connection the neutral line of the elastic body represented by the axle or bogie beam or a line parallel to it. In the ideal case, the sensor measures only the shear, caused by the load introduced into the landing gear, of the axle or bogie beam in the region of the measurement point at which the sensor is arranged.

Differing from the ideal case, one of the possible errors of measurement occurs in the event of torsion and also in the case of additional shear of the landing gear which have been caused not only by the load but, for instance, dynamically upon braking or traveling around curves. This torsion and additional shear of the landing gear, however, do not occur only upon travel, but also upon standing if, for instance, the entire landing gear or individual wheels are not level. In order to compensate for the measurement errors caused at the point of measurement as a result of the torsion of the axle or bogie beam, it is known to arrange one sensor each on a pair of lugs at two measurement points of the axle or bogie beam or of the shock-absorber landing-gear leg which lie opposite each other on the outside. In this way, both of the sensors of this arrangement which lie opposite each other on the outside experience an oppositely directed equal deflection as a result of a moment of torsion which occurs on the axle or bogie beam. The output signals of the two sensors are so linked to each other in an electronic device, particularly a computer, that the effects of the moment of torsion on the two sensors compensate for each other. In actual practice however this compensation is not complete.

SUMMARY OF THE INVENTION

It is an object of the present invention to develop the arrangement of sensors on the landing gear of an aircraft for measuring the weight and position of center of gravity of the aircraft of the aforementioned type in such a manner that improved compensation for the measurement error caused by the torsional deflection is obtained.

Accordingly, the invention provides an arrangement of sensors on the landing gear of an aircraft for measuring the weight and position of the center of gravity of the aircraft in which, in order to compensate for errors caused by moments of torsion, one sensor each is arranged on a pair of lugs (53, 54) on two measurement points of an axle (55) or bogie beam or of a shock-absorber landing-gear leg which lie opposite each other on the outside, and in which each of the sensors gives off an electric output variable which corresponds to a vertical displacement (sensor deflection) between the lugs of a pair, wherein the lugs (53, 54) are tapered at their roots (60, 61).

The invention is based on the discovery that the previously, merely limited compensation of the torsional deflection is caused by the customary shaping of the lugs which, in particular, are of block shape and have from their point of transition into the axle or bogie beam up to their remote end an approximately constant circumference or constant cross section, if one disregards a central attachment opening in the lug in the vicinity of its free end side. Upon torsion of the axle or bogie beam, the customary cross-sectional shape of the lug at the point of transition to the axle or bogie beam is distorted to a considerably greater extent than at the outer end side. In particular, with a rectangular cross section, there is noted a parallelogram distortion at the point of transition. These distortions of the cross-sectional shape of the lugs act differently at the measurement points of the axle or bogie beam which are opposite each other on the outside: upon the superimposing of the line of bend caused by the weight on the measurement point, the one measurement point, the additive side, is affected more strongly by the reduction in the measurable torsional deflection than the opposite measurement point, the subtractive side.

By the tapering of the lugs at their roots, i.e. transition points to the axle or bogie beam, distortion of the cross section in the lugs and the disadvantageous consequence thereof on the output signal of the sensor or the useful signal are substantially avoided. The essential factor is that at most only a small part of the torsional deflection of the lugs on the axle or bogie beam is lost for the measurement of the load, since the distortion in cross section is minimized over the depth of the lugs.

According to a feature of the invention, with a basic block shape of the lugs (53, 54), the lugs are undercut at their points of transition to the axle (55) or bogie beam or roots (60, 61) transverse to the longitudinal direction of the axle or bogie beam. If the block-shaped are, as customary, aligned on the axle or bogie beam, this means that the undercuts are arranged on the narrow sides of the lugs. In this way, the parallelogram distortion of the rectangular cross-sectional shape which otherwise occurs is effectively reduced without excessively weakening the lug. The undercuts are in this connection advisedly made with the smallest possible radii, so that taperings which cut inward as much as possible are obtained with otherwise constant dimensions of the lugs.

Complete compensation for the error in measurement caused by the torsional deflection of the axle or bogie beam with two lugs arranged opposite each other on the outside on the axle or bogie beam can take place not only when symmetrical inductive sensors of the aforementioned type are arranged on the pairs of lugs, but also when using in principle identical but asymmetric inductive sensors which can be provided in order to avoid another error coming from the effect of application and removal of load. These asymmetric sensors are arranged at different distances between a center line of the two coils which passes through the sensitive center points of the coils and an attachment point of the first sensor part containing the coils on the one hand and between said center line and a point of attachment of the second sensor part to the coil. These asymmetric sensors can be so fastened to the pairs of lugs of a conical axle or conical bogie beam that the result of a weight measurement which is derived from the output variables of the sensors is, in particular, not falsified by a moment of rotation introduced on the axle or bogie beam by the lateral forces on the tires.

The arrangement of the sensors with specially developed lugs in accordance with the invention is suitable in general for sensors having two sensor parts each of which is arranged on one lug of a pair of lugs, the sensor giving off an output signal corresponding to a vertical displacement between the lugs of one pair. These may, for instance, be capacitive sensors. However, inductive sensors of the type having two coils connected in series and with a tongue of ferromagnetic material moveable in the coils are preferred.

According to a feature of the invention, there are provided as sensors inductive sensors of the type having two series-connected coils (22, 23) in a first sensor part (21) and having a tongue (26) of ferromagnetic material which is moveable in the coils and is part of a second sensor part (25).

BRIEF DESCRIPTION OF THE DRAWING

With the above and other objects and advantages in view, the present invention will become more clearly understood in connection with the detailed description of preferred embodiments, when considered with the accompanied drawings, of which.

DETAILED DESCRIPTION OF THE PREFERRED EMBODIMENTS

Figure 1:
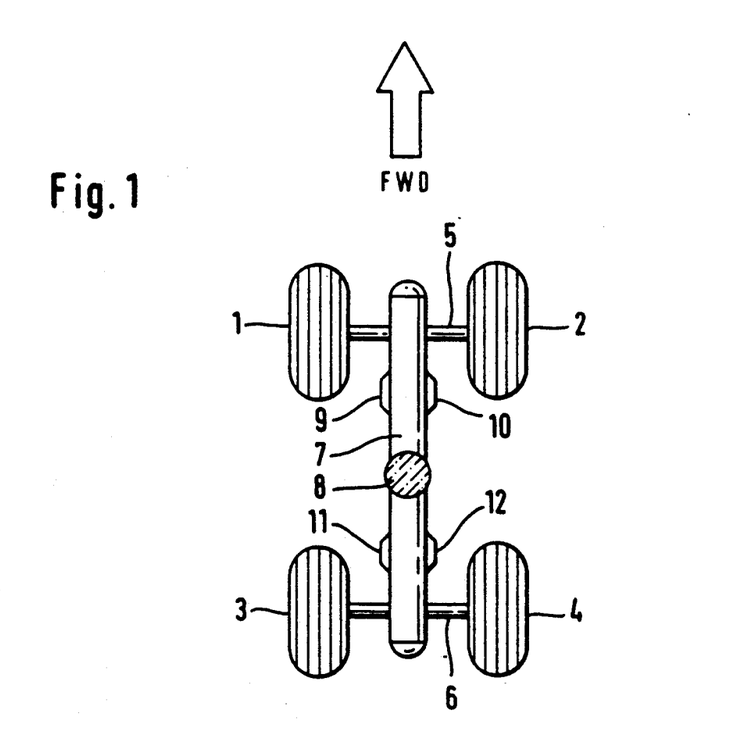
FIG. 1 shows an arrangement of four sensors on the landing gear of an aircraft, shown diagrammatically in top view.

FIG. 1 shows a part of a landing gear having two pairs of wheels 1, 2 and 3, 4. The axles 5, 6 of these pairs of wheels are arranged on a bogie beam 7. The bogie beam is connected to the aircraft via an oil shock absorber 8, shown in cross section. Four inductive sensors 9–12 are arranged in each case in pairs opposite each other on the bogie beam 7. Each pair of sensors incorporates a measurement path having two measurement points of the bogie beam. The two sensors 9, 10 and 11, 12 of a pair of sensors are arranged diametrically opposite each other on the tubular bogie beam.

Figure 2:
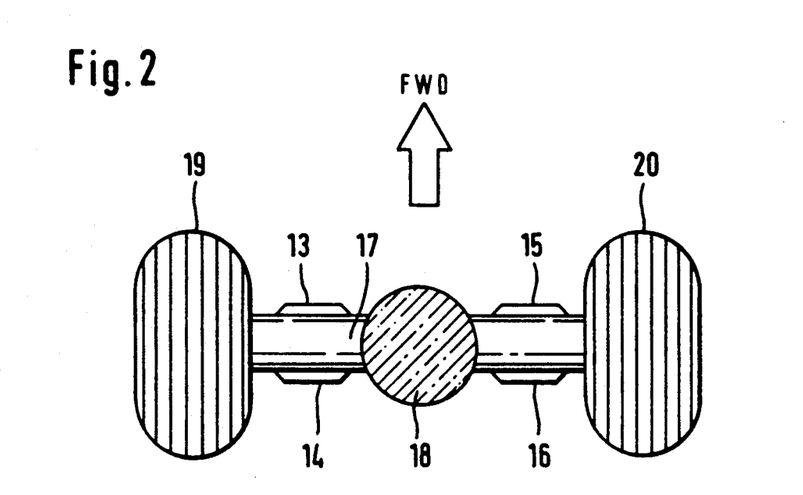
FIG. 2 shows another arrangement of four sensors on another landing gear, also shown diagrammatically in top view.

FIG. 2 shows another arrangement of four sensors 13–16, namely on an axle 17 of an airplane landing gear which is connected to the aircraft via an oil shock absorber 18, which is also shown in cross section. Wheels which are mounted on the tubular axle bear the reference numbers 19, 20. The sensors 13, 14 and 15, 16 of each pair are in this case also arranged diametrically opposite each other on the axle. They are therefore at the same distance from an imaginary center point of the oil shock absorber 18.

Figure 3:
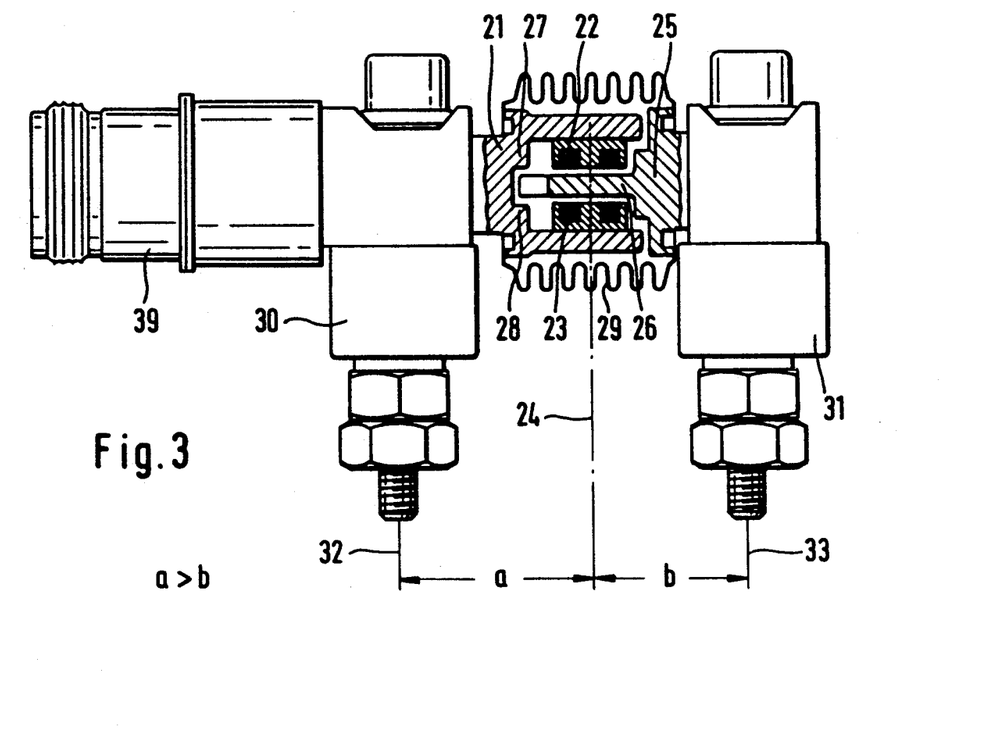
FIG. 3 is a longitudinal section through an asymmetrically developed sensor.

FIG. 3 shows one of the sensors in a partial sectional side view. Within a fork-shaped first sensor part 21, two horizontal coils 22, 23, lie one above the other. A common center line which passes through these coils and lies in the sensitive center points of the coils is indicated in dot-dash line and bears the reference numeral 24. A second sensor part 25 which extends into the first sensor part is provided with a tongue of soft ferromagnetic material 26 which extends into a space between the two coils 22 and 23 in the first sensor part. The tongue is moveable in all directions in this space as long as it does not strike against stops 27, 28. The inside of the first and second sensor parts is screened off from environmental influences by a bellows 29 which connects the two sensor parts to each other. It can furthermore be noted from FIG. 3 how the first sensor part 21 and the second sensor part 25 are screwed on the respective lugs 30 and 31. An imaginary central attachment point of each of these screw attachments is indicated by dot-dash line and designated 32 and 33 respectively.

The sensor shown in FIG. 3 is of asymmetric development, the distance $a$ between the point of attachment 32 of the first sensor part 21 and the center line 24 through the two coils on the one hand being greater than the distance $b$ between the point of attachment 33 of the second sensor part 25 and the center line 29 through the two coils on the other hand.

As an alternative, in another embodiment the distance $a$ may also be smaller than the distance $b$.

The asymmetric sensors are preferably intended for attachment to an axle or bogie beam which is developed in customary manner and is conical, contrary to the showings in FIG. 1 and FIG. 2.

With a tubular axle or bogie beam or one formed of a hollow cylinder as place of attachment of the sensors which are grouped in pairs, as shown in FIGS. 2 and 1, there are used on the other hand symmetrical sensors with which the distances $a$ and $b$ are equal to each other.

Regardless of whether the sensor is symmetrical or asymmetrical, it forms output signals in accordance with the principle of inductive voltage division at the two series-connected coils 22 and 23 as a function of the position of the tongue 26. In detail, the sensor measures the vertical position of the tongue 26 between the two coils 22 and 23 or a shift in height with respect to the average starting position shown. A mere swinging of the tongue around an imaginary center point which lies in the center line 24 or a horizontal displacement has no influence on the output variables of the sensor.

The sensor of the type shown in FIG. 3, whether asymmetrical or symmetrical, is also known as a shear-force sensor, since, with the vertical displacement of the tongue 26 with respect to the coils 22 and 23, it measures the shearing force which occurs on the axle or bogie beam to which the sensor is connected via the lugs 30 and 31. On the other hand, the sensor does not experience any deflection when the axle or bogie beam has no curvature of the neutral line or line of bend in the region of the lugs or when the curvature is uniform or with center symmetry.

Figure 4:
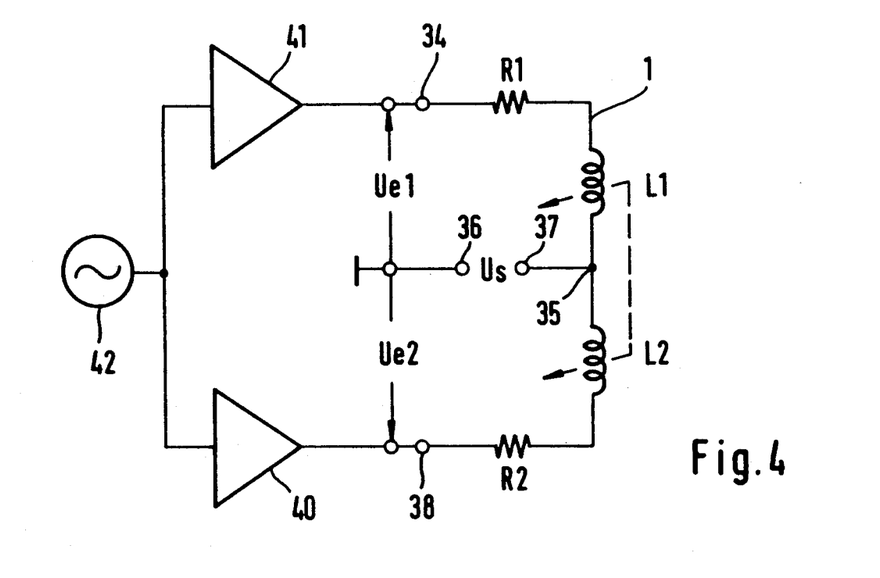
FIG. 4 is an electric circuit arrangement of the sensor of FIG. 3.

FIG. 4 shows a circuit in which a sensor according to FIG. 3 is shown. Here, terminals which are seated in FIG. 3 in a connection box 39 are designated 34, 36-38. In FIG. 4, the sensor is shown as an equivalent circuit. The active inductances of the two coils 22 and 23 (connected at the point 35) are designated L1 and L2 in FIG. 3. These inductances can be acted on in opposite directions by the tongue 26, as is indicated in FIG. 4 by the arrows which are connected together by an interrupted line. R1 and R2 are compensating resistors which represent the ohmic resistances of the coils 22 and 23 as well as of their feed lines. The two coils are acted on with opposite-phase exciter currents Ue1 and Ue2 by amplifiers 40 and 41 which are energized by a source of alternating voltage 42. An output voltage or sensor voltage Us between the terminals 36 and 37 constitutes a measure of the displacement of the tongue, which influences the amount of the inductances L1 and L2.

In order to compensate for errors caused by torsional moments, two sensors of a pair, for instance the sensors 13, 14 or 15, 16 in FIG. 2, are in each case so connected with each other on the output side that the weight wt resting on the corresponding half axle of the axle 17 is measured in accordance with the equation $$wt_{axle} = A_1 \cdot m_1 + A_2 \cdot m_2.$$

Herein $A_1$ and $A_2$ are deflections of the first sensor and the second sensor, and $m_1$ and $m_2$ are the corresponding scaling factors. The numerical values for the weight $wt_{axle}$ can be formed by a hardwired computer or a programmable computer.

In the above-mentioned connection of the sensor deflections $A_1$ and $A_2$ of the sensors arranged in pairs, for instance 13, 14 and 15, 16 in FIG. 2, with which two sensors of a pair lie exactly opposite each other, the mutual deflections of the tongue, caused by moments of torsion, with respect to the coil are substantially compensated for within the computer.

Figure 5:
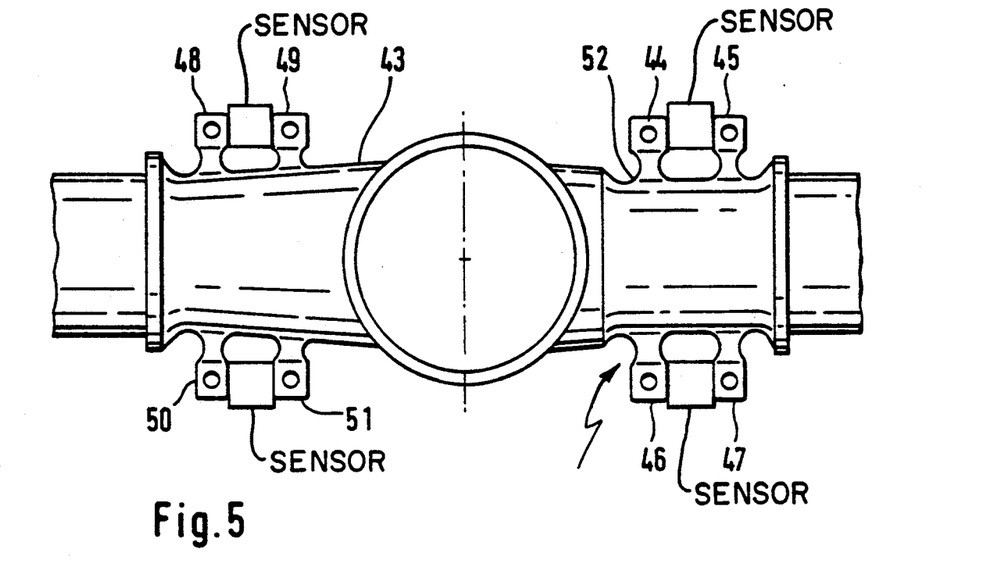
FIG. 5 shows an arrangement and development of pairs of lugs for attachment of the sensors to an axle, shown in top view, the sensor being indicated diagrammatically.
Figure 6:
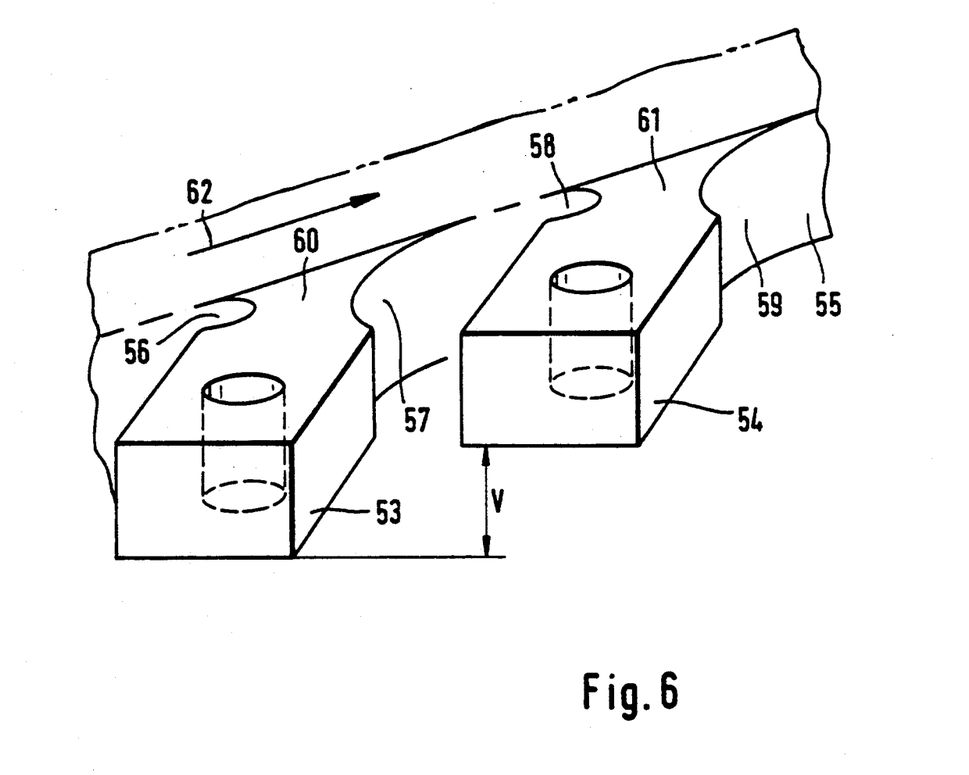
FIG. 6 is a perspective view of a pair of lugs developed in accordance with the invention on a twisted axle or bogie beam.

In order for the compensation to be as complete as possible, the lugs are undercut, as shown in FIGS. 5 and 6.

FIG. 5 shows an axle 43 the left part of which is developed conically in conventional manner while its right part is cylindrical in the region of lugs 44-47 in order to suppress the effects of the application and removal of load. If only the left conical part of the axle is realized, asymmetric sensors for depressing the effects of the application and removal of load are preferably mounted on lugs 48-51 of said part.

As shown diagrammatically in FIG. 5, one sensor is fastened on each pair of lugs 44, 45; 46, 47; 48, 49; 50, 51. In order to optimize the compensation of errors caused by moments of torsion with this arrangement of sensors in pairs, the lugs are tapered or undercut at their places of transition to the axle. One such tapering on the lug 44 is designated 52 in FIG. 5. The shape and position of the taper can be noted more precisely from FIGS. 6, 9 and 10. In FIG. 6, two lugs 53 and 54 are shown on an axle 55, only part of which is shown, in torsionally twisted condition of the axle. From FIG. 6, there can furthermore be noted the approximately basic block shape of the lugs, which shape however is varied by four undercuts 56-59 at roots 60, 61 of the lugs 53, 54. In this connection, the roots represent the points of transition of the lugs to the axle. It can be noted that the other sides of the lugs extend approximately parallel to a longitudinal direction of the axle, which is designated by an arrow 62. As a result of the loading of the axle by the weight of the aircraft and of an axle which is twisted, for instance, by braking or when at a standstill with the brake applied, the lugs 53, 54 are spaced from each other by a vertical distance V. This distance is relatively large and can be used to compensate for the error caused by the moment of torsion since the lugs 53, 54 are not considerably deformed or distorted in the region of their roots, as is the case without undercuts, by the twisting of the axle. The undercuts are developed as roundings of the smallest possible radii so that these undercuts are as cut in as much as possible with a given depth of the lugs. In the configuration shown in FIG. 6, the output signal of the sensor which is attached to the lugs 53, 54 is linear or proportional to the torsional deflection. The portion of the vertical distance V caused by the bending due to the weight of the axle can be measured substantially without error.

Figure 9:
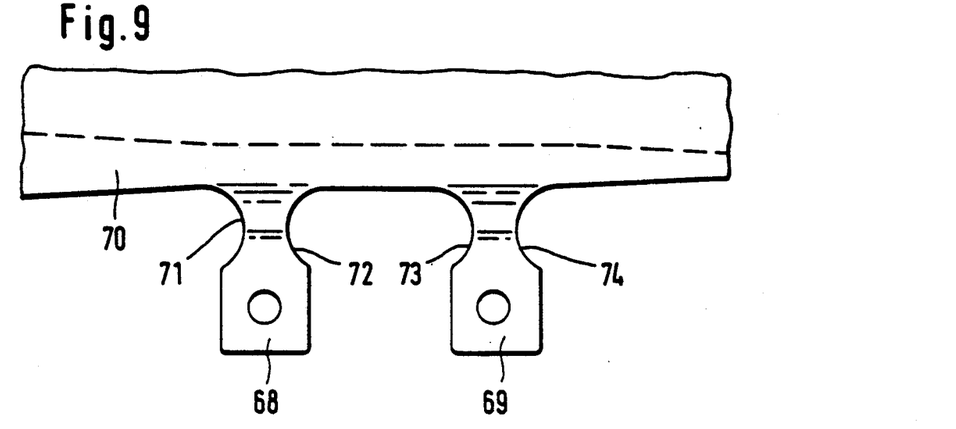
FIG. 9 is a top view of another pair of undercut lugs in accordance with the invention.
Figure 10:
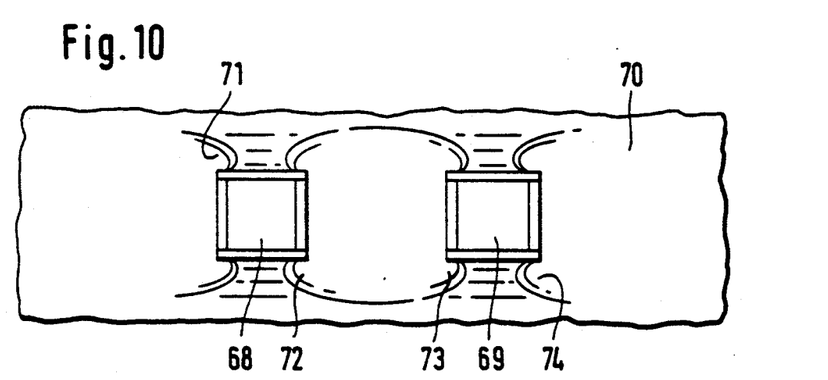
FIG. 10 is a side view of FIG. 9.

FIGS. 9 and 10 show another pair of lugs 68, 69 on a portion of an axle 70 which have deep cylindrical undercuts 71-74.

Figure 7:
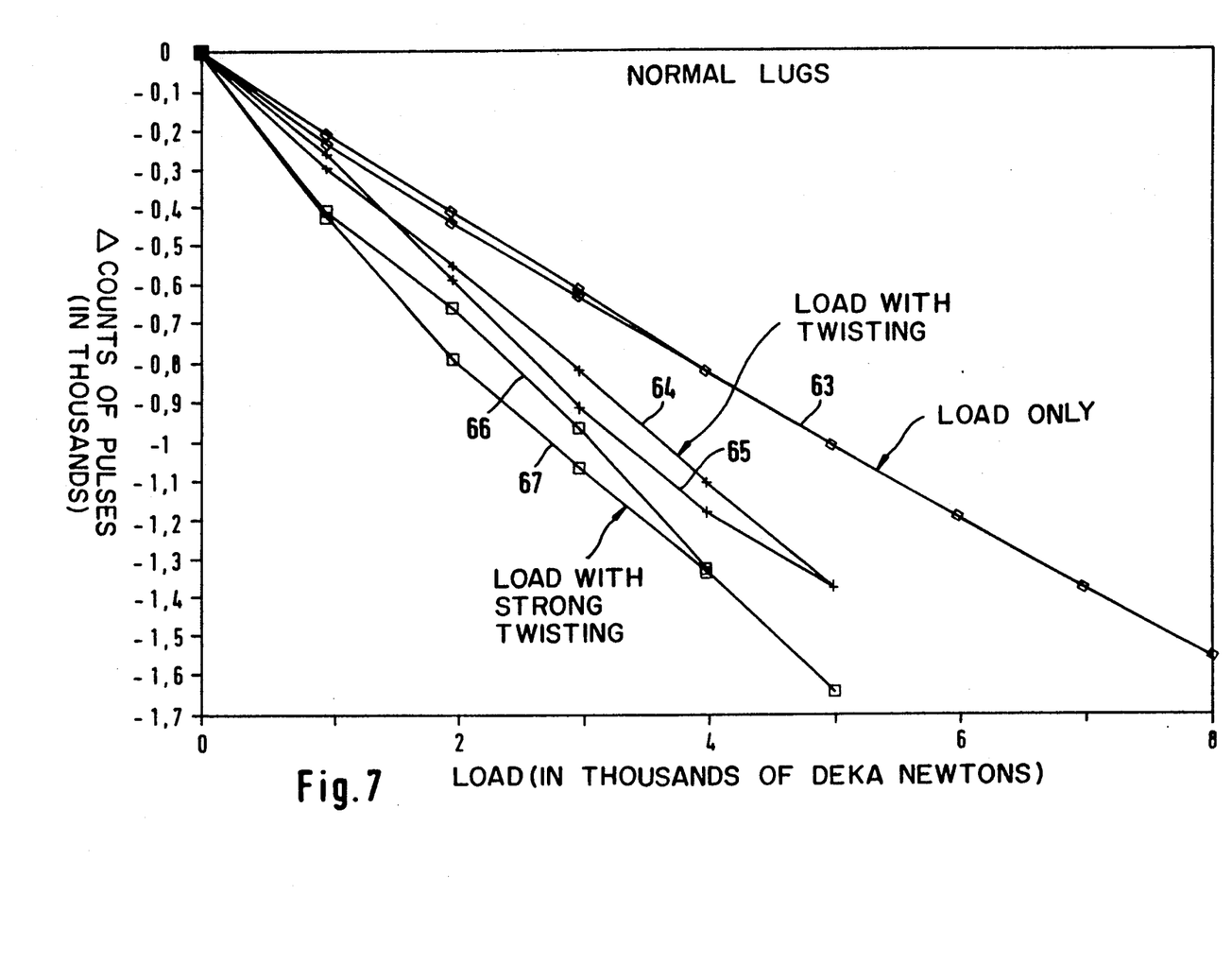
FIG. 7 shows curves for different cases of load with lugs of conventional development.
Figure 8:
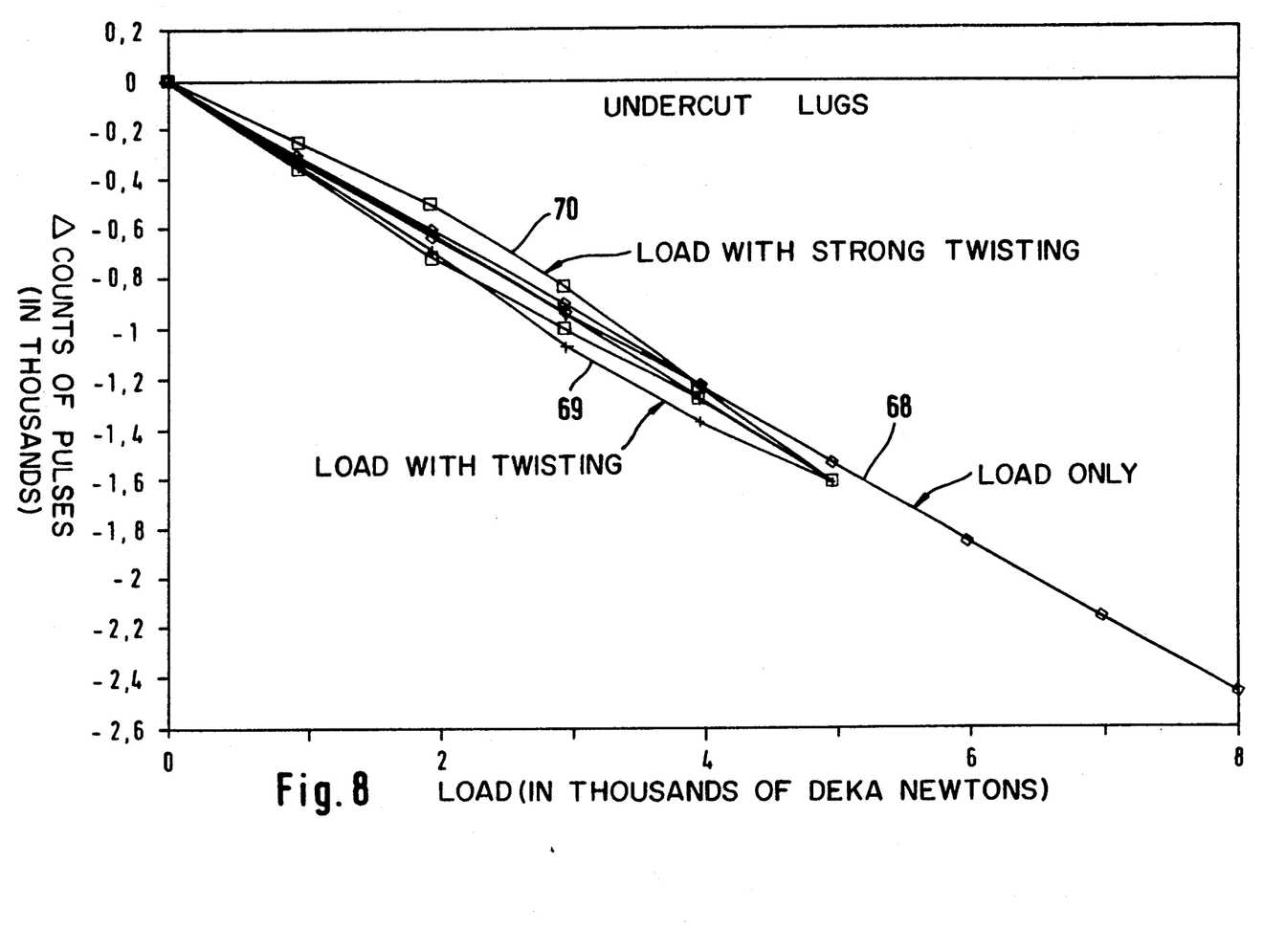
FIG. 8 shows curves for different cases of loads for lugs developed in accordance with the invention.
Figure 11:
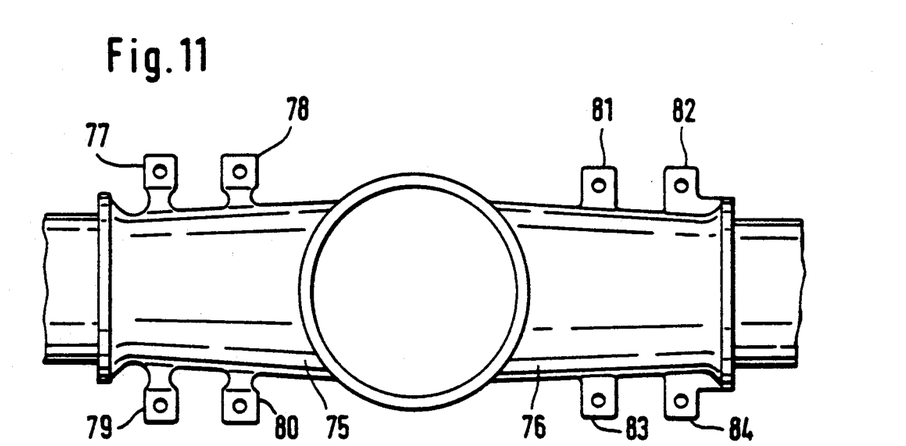
FIG. 11 shows an experimental axle on which the curves shown in FIGS. 7 and 8 were ascertained.

The surprising effect of the undercuts of the lugs, which was ascertained on an experimental axle in accordance with FIG. 11, is shown in FIGS. 7 and 8. FIG. 11 shows the experimental axle with a conical left half 75 of the axle and also a conical right half 76 of the axle. Each of the two axle halves 75, 76 has, on diametrically opposite places, pairs of lugs 77, 78; 79, 80; 81, 82; 83, 84, the lugs 77, 78; 79, 80 on the left half of the axle being undercut in contradistinction to the lugs 81, 82; 83, 84 of the right half of the axle, which are otherwise of the same construction.

FIG. 7 shows the dependence of the measurement value in Δ counts formed from the output variables of a pair of sensors, namely counting pulses, as a function of the load, the pair of sensors being arranged on the non-undercut lugs 81-84 of the right half 76 of the axle. A characteristic curve 63 was measured only under load without twisting of the landing gear. It is approximately a straight line. The characteristic curves 64 and 65, on the other hand, were measured with simultaneous torsion of parts of the landing gear on which the sensors are arranged, and particularly of the axle. These characteristic curves show a clear deviation from the characteristic curve without torsion of the landing gear.

The deviations are even greater in the case of the characteristic curves 66, 67, in connection with which parts of the landing gear are strongly twisted.

FIG. 8 is based on the left half 75 of the axle having a pair of sensors the output variables of which are combined with each other in order to compensate for the torsion-produced error, at the lugs 77-80 which are undercut at their roots. FIG. 8 shows substantially better behavior of the resultant measurement value, which is again measured in Δ counts, as a function of the load and substantially independently of whether it was determined only in the case of pure load or with simultaneous greater or lesser twisting of parts of the landing gear. The characteristic curve for the case of pure load is designated 68. A characteristic curve 69 in the case of which parts of the landing gear on which the sensors are arranged are simultaneously twisted, as well as a characteristic curve 70 for stronger twisting of parts of the landing gear, extend close to the pure load curve 68. Deviations of the measured values from the pure load curve 68 are considerably less in the different cases of torsion of parts of the landing gear than with corresponding measurements with the use of normal non-undercut lugs.

Legends of FIG. 7 a) Δ counts (in thousands)
b) Load with twisting
c) Load only
d) Load with strong twisting
e) Load Legends of FIG. 8 a) Undercut lugs
b) Load with strong twisting
c) Δ counts (in thousands)
d) Load with twisting
e) Load only
f) Load

We claim:

1. A system of sensors on the landing gear of an aircraft for measuring the weight and position of the center of gravity of the aircraft, the system comprising;
   a plurality of sensors, a plurality of lugs extending from a member of the landing gear wherein said member is axle or bogie beam or shock-absorber leg of the landing gear; and
   wherein in order to compensate for errors caused by moments of torsion, one sensor of said plurality of sensors is mounted on each of a pair of said lugs located on two measurement points of said member which lie opposite each other on the outside of said member; and
   each of the sensors gives off an electric output variable which corresponds to a sensor deflection from a displacement between the lugs of a pair of said lugs, said lugs being tapered at their roots, each of said lugs having a reduction in cross-sectional dimension at a point of tapering.

2. A system according to claim 1, wherein
   said lugs have a block shape and are undercut at their points of transition to said member transverse to a longitudinal direction of said member.

3. A system according to claim 1, wherein each of said sensors is an indicator sensor comprising:
   two series-connected coils disposed in a first part of the sensor;
   a tongue of ferromagnetic material located in a second part of the sensor; and
   wherein said tongue extends into said first sensor part and is moveable in said coils of the sensor.

* * * * *